United States Patent
Kim (12)

(10) Patent No.: US 6,221,309 B1
(45) Date of Patent: Apr. 24, 2001

(54) METHOD OF MANUFACTURING FISHING WEIGHT FOR PREVENTING WATER POLLUTION

(76) Inventor: Manjoo Kim, 9-3, 3-9, Seodaesin-dong, Seo-ku, Pusan, 602-090 (KR)

( * ) Notice: Subject to any disclaimer, the term of this patent is extended or adjusted under 35 U.S.C. 154(b) by 0 days.

(21) Appl. No.: 09/480,212

(22) Filed: Jan. 10, 2000

(51) Int. Cl.[7] ............................................. B28B 3/00

(52) U.S. Cl. ............................................. 264/632; 264/603

(58) Field of Search ............................ 264/603, 632; 43/43.12, 43.14, 44.87

(56) References Cited

U.S. PATENT DOCUMENTS 6,058,643 * 5/2000 Marusak et al. .................... 43/42.11

FOREIGN PATENT DOCUMENTS 10-042763 * 2/1998 (JP) .

* cited by examiner

*Primary Examiner*—Christopher A. Fiorilla
(74) *Attorney, Agent, or Firm*—Notaro & Michalos P.C.

(57) ABSTRACT

A method for manufacturing a fishing weight prevents environmental pollution. The method includes the steps of molding the fishing weight of a ceramic material and heating the molding material up to a predetermined temperature to convert the heated material into a pure earth material.

4 Claims, 1 Drawing Sheet

METHOD OF MANUFACTURING FISHING WEIGHT FOR PREVENTING WATER POLLUTION

FIELD OF THE INVENTION

The present invention relates to a fishing weight which is used in all types of fishing, and more particularly, to a fishing weight which is manufactured with a pure earth material, to thereby prevent water pollution.

BACKGROUND OF THE INVENTION

Generally, when reel fishing or fishing on a sea rock is implemented, a fishing weight is used to cast a fishing line which is connected to a fishhook, into the water, so that the fishhook is sunk into the water and is finally disposed at a desired position. Of course, a buoyant float is used, considering the weight of the fishing weight, to support the fishhook by using its own buoyance, such that the fishhook can float on the water. At this time, the fishing weight is generally manufactured by a lead material and has an oval shape, which may be variable upon determining the shapes thereof.

Furthermore, many such weights are made of the lead material are used for a fishing net, a cultivating farm net, various kinds of fish traps and so on, which are widely used in the whole world. As a result, many such fishing weights sink into the water and are not recovered.

However, since there have been recently developed fishing equipment which have a relatively excellent durability and are well repaired at a proper time, even though a serious problem that the fishing weight made of the lead material causes water pollution has emerged over the whole world, it can be expected that the damage caused by fishing equipment will be reduced. In the preferred embodiment of the present invention, therefore, an attention on the problems caused from the fishing weights made of the lead material which are deserted into the water by fishermen will be given.

Meanwhile, when fishing is executed on the sea, river, lake, a reservoir and the like, the fishhook is often caught on a water grass, stone, a gap in the rocks, or a net, which results in the cut-off of the fishing line. At the time, the fishing weight made of the lead material is deserted into the water, along with the cut-off fishing line.

In addition, after completing the fishing, it is common that fishermen cast the fishing weight made of the lead material into the water. The fishing weights which have been deserted into the water are continuously stacked on the bottom surface and, during a very long time period, are corroded and oxidized to thereby pollute the sea or river by heavy metals (for example, the lead material). Further, such water pollution may cause a fishery ecosystem to be destroyed. As a result, this destruction hinders the development of the fishing industry and the cultivating industry on the seas along the coast or adjacent seas, river, reservoir and the like Furthermore, this destroys the natural ecosystem on the seas along the coast or adjacent seas.

Accordingly, it is natural that the fishing weight made of the lead material which have been deserted in the water should be collected, but the collecting work is not well operated for various reasons. Therefore, as time elapses, the water pollution problem becomes more and more serious, which may badly effect the balance of ecosystems on the earth.

SUMMARY OF THE INVENTION

An object of the present invention is to provide a fishing weight for preventing environmental pollution which is manufactured with a pure earth material and even though last in the water, prevents water quality from being deteriorated or polluted, to thereby preserve an the ecosystems of the earth as well as fishery ecosystems.

Another object of the present invention is to provide a fishing weight for preventing environmental pollution which does not need additional work for collecting the fishing weight which is deserted into the water along with a fishing line which is cut off due to hooking onto an object in the water.

To achieve these and other objects according to the present invention, there is provided a method for manufacturing a fishing weight which prevents environmental pollution, including the steps of: molding the fishing weight with a ceramic material; and heating the molding material up to a predetermined temperature to convert the heated material into a pure earth material.

BRIEF DESCRIPTION OF THE DRAWINGS

Other objects and aspects of the invention will become apparent from the following description of embodiments with reference to the accompanying drawing in which.

DETAILED DESCRIPTION OF THE PREFERRED EMBODIMENTS

Hereinafter, an explanation a manufacturing process of a fishing weight for preventing environmental pollution according to a preferred embodiment of the present invention will be discussed. Explanation on well-known functions or constructions to those skilled in the art will be excluded in this detailed description for the sake of brevity.

Figure 1:
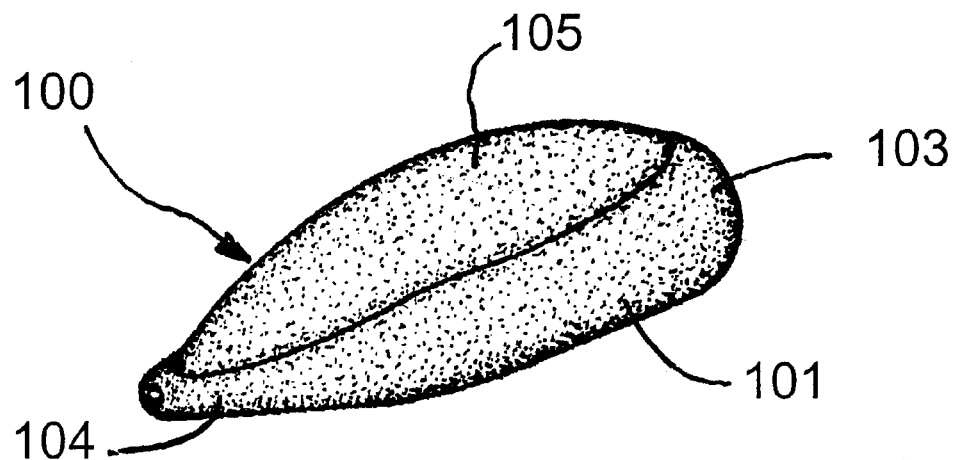
FIG. 1 is a perspective view illustrating a fishing weight for preventing environmental pollution constructed according to a preferred embodiment of the present invention.
Figure 2:
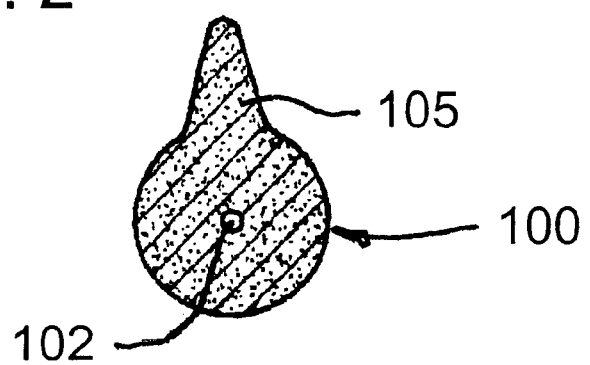
FIG. 2 is a sectional view of FIG. 1.

Referring to FIGS. 1 and 2 showing a fishing weight which is manufactured with a pure earth material according to a preferred embodiment of the present invention, the fishing weight 100 includes a hole 102 at the center thereof, through which a fishing line is inserted. Generally, the fishing weight 100 has an oval shape, but may be variable to have a circular shape, a square shape, or any other shape. In FIGS. 1 and 2, the weight 100 has a cylindrical body 101 with a semi-circular end 103 and a conical end 104. A top projection 105 having a triangular cross-section and tapering front and rear ends lies above the top of the body 101.

On the other hand, the fishing weight 100 is manufactured with a pure earth material. In more detail, the fishing weight 100 is molded into a predetermined shape made of a ceramic material by means of a press means and is then put into the interior of a furnace to be heated up to a temperature of about 1300° C. or more. At the time, in the fishing weight 100 made of the ceramic material, since a metal component among the ceramic composing components is molten and oxidized, a pure ceramic, i. e. a pure earth material remains in the fishing weight 100. Next, the fishing weight 100 is gradually cooled to room temperature (in the air), such that the manufacturing process for the fishing weight 100 made of the pure earth material is completed.

If the size of the fishing weight constructed according to the present invention is adjusted not to generate a serious weight difference from a conventional fishing weight (made of a lead material), the fishing weight which is made of the pure earth material can be used without any inconvenience.

While the present invention has been described with reference to a specific embodiment, the description is illustrative of the invention and is not to be construed as limiting the invention. However, various modifications in which the fishing weight which is attached to a fishing net, a cultivating net and the like may be manufactured with a pure earth material may occur to those skilled in the art, without departing from the spirit and scope of the present invention.

As discussed above, a fishing weight for preventing environmental pollution constructed according to the present invention is manufactured with a pure earth material and under the state where it is deserted into the water, can be finally reduced to a natural component, as a predetermined time elapses, to thereby prevent water quality from being deteriorated or polluted and further to preserve the fishery ecosystem, without any destruction.

What is claimed is:

1. A method of manufacturing a fishing weight comprising:

casting an elongated shape of ceramic material in a press;

heating the elongated shape in a furnace to a temperature of above 1300° C. to form a pure solid ceramic weight; and providing a hole through a long axis of the weight.

2. A method according to claim 1 including casting of the ceramic material to have a cylindrical body with an elongated projection on the body.

3. A method according to claim 2 including casting of the ceramic material so that the body has one semi-circular end and an opposite tapered conical end, the hole extending through the semi-circular and conical ends.

4. A method according to claim 3, including casting the ceramic material so that the projection has a triangular cross-section with tapered front and rear ends on the body.

* * * * *